United States Patent [19]
Parker

[11] 3,712,774
[45] Jan. 23, 1973

[54] MOLDING MACHINE HAVING YIELDABLY RESTRAINED CLAMPING FORCE APPLYING ELEMENT

[75] Inventor: Henry R. Parker, New Boston, N.H.

[73] Assignee: Improved Machinery Inc., Nashua, N.H.

[22] Filed: Oct. 14, 1970

[21] Appl. No.: 80,660

[52] U.S. Cl. .................425/154, 91/410, 100/52, 100/272, 192/150, 425/450, 425/DIG. 45
[51] Int. Cl. ..............................................B29f 1/00
[58] Field of Search......18/30 LM, 30 LT, 30 LV, 30 LA, 18/DIG. 45, 30 CS; 425/153, 154, 242, 450; 100/53, 272; 192/150; 91/410

[56] References Cited

UNITED STATES PATENTS

| | | | |
|---|---|---|---|
| 3,310,840 | 3/1967 | Aoki | 18/30 LM |
| 3,540,524 | 11/1970 | Bachelier | 18/30 LV X |
| 2,801,442 | 8/1957 | Moslo | 18/DIG. 45 |
| 2,498,264 | 2/1950 | Goldhard | 18/30 LV UX |
| 3,263,277 | 8/1966 | Ohlendorf et al. | 18/30 LV |
| 2,743,704 | 5/1956 | Banker | 91/410 |
| 3,319,298 | 5/1967 | Kiraly | 192/150 X |
| 3,426,873 | 2/1969 | Tezuka | 100/53 X |
| 3,564,657 | 2/1971 | Aoki | 425/154 X |

FOREIGN PATENTS OR APPLICATIONS 1,493,473   7/1967   France .................18/30 LV Primary Examiner—J. Spencer Overholser
Assistant Examiner—Michael O. Sutton
Attorney—Carl R. Horten, David W. Tibbott and Robert R. Paquin

[57] ABSTRACT

A molding machine wherein a platen includes a cylinder containing a clamping piston which is fluid actuatable for applying clamping force to the movable platen, and a second piston yieldably restrains movement of the clamping piston. Control means are responsive to movement of the clamping piston against the yieldable restraint of the second piston to prevent supply of actuating fluid to the clamping piston.

13 Claims, 3 Drawing Figures

INVENTOR
HENRY R. PARKER
BY
Robert R. Paquin
ATTORNEY

MOLDING MACHINE HAVING YIELDABLY RESTRAINED CLAMPING FORCE APPLYING ELEMENT

This present invention relates to molding machines and more particularly to molding machines of the type wherein clamping force is applied to a movable platen by a movable clamping element.

Conventionally, molding machines of this general type are frequently employed for the injection molding of plastic material. During the operation of such molding machines, the final clamping force may be applied to the mold through the movable platen by a clamping force applying element in the form of a relatively large diameter fluid actuated piston. (Such an arrangement employing a toggle linkage to drive the movable platen is, for example, disclosed in U.S. Pat. No. 3,335,463 assigned to the assignee of the present invention.) In this event, during the closing of the platens and resultant closing of the mold, the large diameter piston is conventionally restrained from movement by either having the piston bottom against the enclosing platen or hydraulically locking the piston by valving. The disadvantages inherent in so restraining the piston are, however, well-known in the art. For example, in the event that the piston is held in either of these conventional manners, serious damage to the expensive mold will occur in the event of an obstruction between the mold sections. Also, when the piston is held by being bottomed in a molding machine wherein the movable platen is driven by a mechanical means (e.g., a toggle or a screw jack), flash can result in overstressing of the mechanical means and its resultant frictional locking.

An object of the present invention is to provide a new and improved molding machine which is particularly constructed and arranged whereby the clamping force applying element is, during the closing of the platens, yieldably restrained from moving in a manner causing minimal closing force to be exerted by the element on the movable platen.

Another object of the invention is to provide a new and improved molding machine which is particularly constructed and arranged to cause the clamping force applying element to be yieldably restrained by means other than pressurized fluid directed against the element.

Another object is to provide a new and improved molding machine which is particularly constructed and arranged for preventing the clamping force applying element from exerting clamping force on the movable platen in the event that an obstruction occurs between the mold sections.

Another object is to provide a new and improved molding machine which includes means for maintaining the gap between the mold sections, when the latter are in their closed but not clamped positions, constant during each operating cycle of the machine.

Another object is to provide a new and improved molding machine of the type set forth wherein the clamping force applying element is yieldably restrained by means which are both highly efficient and dependable in operation and relatively simple and economical in construction.

These objects, and other objects and advantages of the invention which will become apparent from the following description taken connection with the accompanying drawings, are attained by the provision of a molding machine which in general comprises a first platen, a second platen movable towards and away from the first platen, drive means for moving the second platen towards and away from the first platen, means including a movable clamping element actuatable for exerting a clamping force on the second platen, and means including a movable element for yieldably restraining the clamping element from moving during movement of the second platen.

Referring to the drawings.

Figure 1:
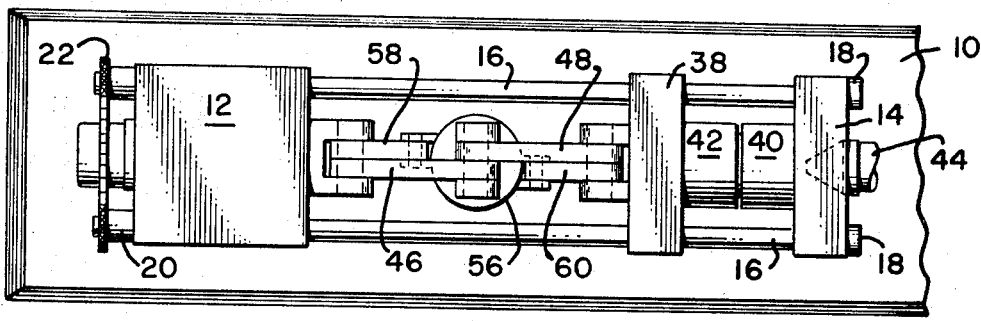
FIG. 1 is a top or plan view of an injection molding machine constructed in accordance with one embodiment of the invention.

Referring more particularly to the drawings wherein similar reference characters designate corresponding parts throughout the several views, the invention has been shown for the purposes of illustration as applied to a molding machine wherein the movable platen is driven through a toggle linkage. It will be understood, however, that the invention is not limited to application in molding machines including toggle linkage drives, but rather has been so shown as a suitable application for the invention. The illustrated injection molding machine comprises a base or support designated generally as 10 which carries a clamping platen 12 and a nozzle platen 14 spaced from the clamping platen 12. A plurality of tie rods 16 extend through the platens 12, 14 and on their ends have restraining nuts 18, 20. An endless driving chain 22 interconnects the nuts with a drive motor 24 which is selectively actuatable to drive the chain 22 whereby the nuts 20 are rotatably driven to thereby longitudinally move the tie rods 16 relative to the platen 12 and also move the platen 14 relative to the latter.

Figure 2:
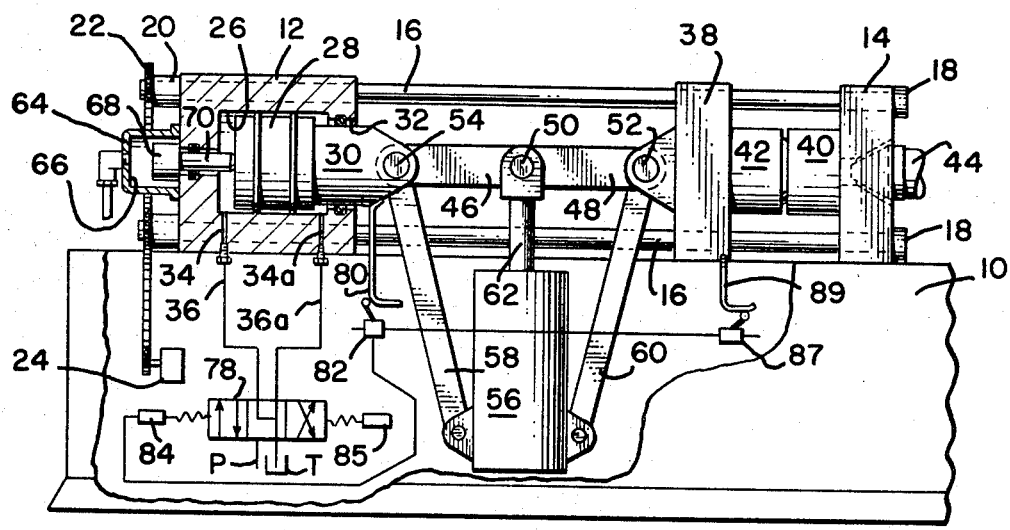
FIG. 2 is an elevational view, partially broken away and in section, of the molding machine illustrated in FIG. 1.
Figure 3:
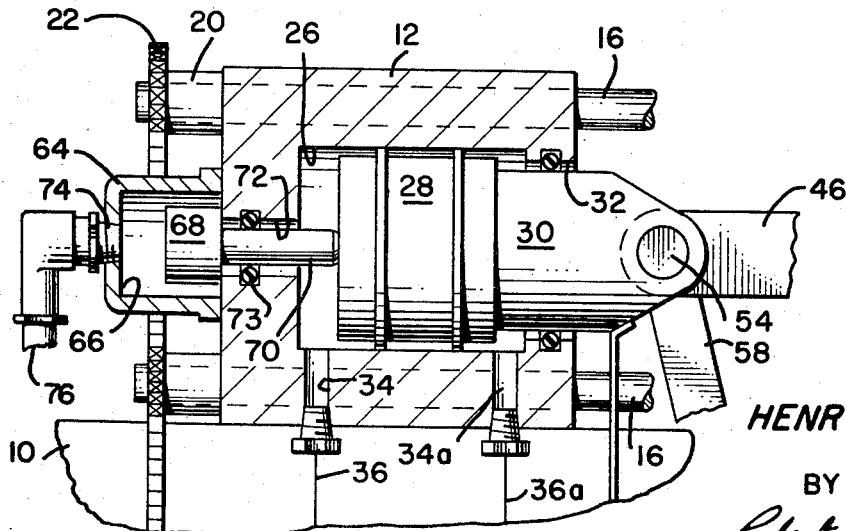
FIG. 3 is an enlarged, fragmentary, elevational view partially broken away and in section, illustrating the clamping platen and associated structure of the molding machine shown in FIGS. 1 and 2.

The clamping platen 12, as shown in FIGS. 2 and 3, contains a relatively large diameter clamping cylinder 26 having therein a clamping piston 28 which is provided with an integral flange 30 projecting outwardly from the cylinder 26 and through an opening 32 in the clamping platen 12. The piston 28 is of the relatively large diameter type conventionally provided in a toggle operated molding machine for exerting a clamping force through the toggle linkage on the mold. The cylinder 26 is provided with an inlet bore 34 connectible through a supply hose shown schematically as 36 with a pressurized fluid supply line P whereby pressurized fluid is selectively suppliable through the hose 36 and bore 34 to urge the piston 28 towards the nozzle platen 14; and the cylinder 26 is also provided with an inlet bore 34a connectible through a supply hose shown schematically as 36a with the pressurized fluid supply line P to supply fluid for urging the piston 28 away from the second platen 14.

Intermediate the platens 12, 14 a movable platen 38 is slidably mounted for movement towards and away from the nozzle platen 14. The nozzle and movable platens 14, 38 during the operation of the molding machine are provided with the conventional mating mold halves or sections 40, 42, respectively; and the plastic material to be molded is in the usual manner injected into the mold halves by a conventional injection unit of an injection nozzle shown as 44.

The movable platen 38 is driven towards and away from the nozzle platen 14 during each molding cycle through a toggle linkage which comprises first and second links 46, 48 having adjacent or inner and remote or outer ends. The links 46, 48 are pivotally interconnected at their inner ends by a pivot pin 50 to form a toggle junction through which the toggle linkage is actuated. The outer end of the second link 48 is pivotally connected to the movable platen 38 by a pivot pin 52; the outer end of the first link 46 is pivotally connected to the flange 30 of the piston 28 by a pivot pin 54. The links 46, 48 are driven between generally aligned closed platen positions shown in FIG. 2 and open platen positions (not shown) in which the links 46, 48 extend in angular relationship above their closed platen positions. As illustrated, the links 46, 48 are driven between their open and closed platen positions by an actuating means comprising a cylinder 56 suspended below the links 46, 48 by supporting arms 58, 60 connected to the pivot pins 54, 52, respectively, and a piston (not shown) in the cylinder 56 and provided with an integral rod 62 connected to the pivot pin 50 at the toggle junction. Alternatively, however, the links 46, 48 could be driven by an actuating means positioned above the links 46, 48 or in any other desired relationship thereto.

In accordance with the present invention, the molding machine is provided with means including a movable element engagable with the piston 28 for yieldably restraining the latter from moving to the left (as shown in FIGS. 2 and 3) during the movement of the links 46, 48 to their closed platen positions. More particularly, as illustrated, this means comprises a cylinder housing 64 mounted on the clamping platen 12 and containing a cylinder 66 of substantially smaller diameter than the cylinder 26. A piston 68 of substantially smaller diameter than the piston 28 is disposed in the cylinder 66 coaxial with the piston 28. The piston 68 is provided with an integral rod 70 which projects into the cylinder 26 through an opening 72 in the clamping platen 12, such opening 72 being provided with a seal 73. The length of the rod is such that (as illustrated in FIGS. 2 and 3) with the piston 68 at the extreme right-hand end of the cylinder 66 the rod 70 positions the piston 28 in spaced relationship to the adjacent end of the cylinder 26. The cylinder housing 64 is provided with an inlet bore 74 communicating the left-hand end of the cylinder 66 with a pressurized fluid supply hose 76 in turn connected to a source (not shown) of pressurized fluid.

The supply of pressurized fluid to the cylinder 26 through the supply hoses 36, 36a is controlled by a conventional four-way valve 78 which, although normally in its illustrated position wherein it simultaneously opens both hoses 36, 36a to the tank or reservoir T, is selectively actuatable by energization of the solenoids 84, 85 to alternatively connect the hoses 36, 36a to the pressurized fluid supply line P. The solenoid 85 during each operating cycle of the molding machine is in the conventional manner automatically energized simultaneously with the initial movement of the movable platen 38 away from the platen 14 and automatically de-energized simultaneously with movement of the movable platen 38 to its open platen or left hand (as viewed in FIG. 2) position. The de-energization of the solenoid 85 may, for example, be accomplished by the employment of a suitable limit switch arranged to be tripped by the movable platen 38; and the energization of such solenoid 85 may, for example, be accomplished by the closing of a pressure switch actuated by the drop in pressure at the head or left hand (as shown in FIG. 2) end of the cylinder 26. The solenoid 84 is electrically connected to the clamp close switch 87 to be normally energized upon the closing of the switch 87 by the switch actuating plate 89 (carried by the movable platen 38) when the platen 38 has been moved to its illustrated closed platen or right platen position. The switch 87 is connected in series with a normally closed switch 82 which, when opened, prevents the energization of the solenoid 84 which otherwise would occur upon the closing of the switch 87. The flange 30 of the piston 28 carries a depending switch actuating plate 80 which, upon movement of the piston 28 towards the piston 68 sufficient to rearwardly displace the latter piston, opens the switch 82. The solenoid 84 is normally during each operating cycle of the molding machine automatically de-energized sequentially with the energization of the solenoid 85 in the conventional manner such as, for example, by employment of a timer set to de-energize the solenoid 84 when a molded article is sufficiently cooled to permit the movable platen 38 to be driven from the platen 14. The aforesaid modes of energization and de-energization of the solenoids 84, 85 are well known in the art and, hence, will not be herein further described in detail.

Throughout the operation of the molding machine, pressurized fluid is maintained in the cylinder 66 at a pressure which need only be sufficient to normally hold the piston 68 in its illustrated position in which the rod 70 projects through the opening 72 into the cylinder 26 and engages the piston 28 whereby the latter is resultantly yieldably held in spaced relationship to the left-hand end of its cylinder 26. The pressure of the fluid in the cylinder 66 is, as will be understood, at a sufficiently low level that the piston 28 is permitted to move rearwardly against this yieldable restraint in the event that an obstruction occurs between the mold sections 40, 42 during the movement of the links 46, 48 to their illustrated closed platen positions.

Assuming the links 46, 48 to be in their open platen positions and the mold sections 40, 42 on the platens 14, 38 to be resultantly spaced apart, the operation of the molding machine normally cyclically proceeds in the following manner. First, the piston in the cylinder 56 is actuated to retract the rod 62 and thereby downwardly move the links 46, 48 to their illustrated platen positions. Assuming no obstruction be to present between the mold sections 40, 42 the actuating plate 89 carried by the movable platen 38 actuates the switch 87 which, as the switch 82 is closed, causes energization of the solenoid 84 to shift the valve 78 whereby the supply hose 36 is connected to the fluid supply line P and the hose 36a is simultaneously connected to the tank T. Thus, pressurized fluid is supplied through the supply hose 36 to the cylinder 26 to cause the piston 28 to exert an extremely high clamping force on the movable platen 38 through the links 46, 48 in their closed platen positions. Then a suitable charge of plasticized material is supplied to the mold sections 40, 42 through the injection nozzle 44.

In the event, however, the mold sections 40, 42 are presented with a therebetween obstruction during the movement of the links 46, 48 to their closed platen positions, the force exerted on the platen 28 during the movement of the links 46, 48 overcomes the yieldable restraint exerted on the piston 28 and causes the latter to rearwardly displace the piston 68. The switch actuating plate 80 is thus moved to trip the switch 82 and resultantly prevent energization of the solenoid 84. As a result, the fluid which would otherwise at this time be supplied to the cylinder 26 for causing the piston 28 to exert its clamping force is prevented by the valve 78 from flowing into the cylinder 26; and the piston 28 is prevented from exerting clamping force on the movable platen which might result in severe damage to the mold sections 40, 42. Rather, instead of the high clamping force of the piston 28, only the minimal force of the piston 68 acts on the movable platen 38 to tend to clamp the mold sections 40, 42. In actual practice, this minimal force applied by the piston 68 will normally be only around one five-hundredth of the force normally applied by the piston 28, thereby greatly reducing any likelyhood of damage to the mold sections 40, 42.

Having thus described my invention, I claim:

1. A molding machine comprising a first platen, a second platen movable towards and away from said first platen, drive means for moving said second platen towards and away from said first platen, first cylinder-and-piston means including a movable clamping element fluid actuatable for exerting a clamping force on said second platen, second cylinder-and-piston means including a movable element fluid actuatable for yieldably restraining said clamping element from moving during movement of said second platen towards said first platen, means for supplying actuating fluid to, and discharging actuating fluid from, said first cylinder-and-piston means independently of said second cylinder-and-piston means, means sealingly preventing fluid communication between the cylinders of said first and second cylinder-and-piston means throughout the machine operation, control means for controlling the supply of actuating fluid to said first cylinder-and-piston means and operable to prevent such flow of fluid, means responsive upon movement of said clamping element during movement of said second platen towards said first platen for causing said control means to prevent such flow of fluid, nd means for supplying actuating fluid to said second cylinder-and-piston means for causing said movable element to so yieldably restrain said clamping element.

2. A molding machine according to claim 1, wherein the yieldable restraining force applied to said clamping element by said movable element is substantially lower than the clamping force applied by said clamping element.

3. A molding machine according to claim 2, wherein said second cylinder-and-piston means is on the opposite side of said first cylinder-and-piston means from said platens, and said movable element engages said clamping element.

4. A molding machine according to claim 3, wherein the clamping element of said first cylinder-and-piston means is of larger diameter than the movable element of said second cylinder-and-piston means.

5. A molding machine according to claim 2, further comprising a toggle linkage connected to said drive means and said second platen to cause said drive means to drive said second platen through said toggle linkage means, and said clamping element being connected to said toggle linkage to apply the clamping force therethrough.

6. A molding machine comprising a first platen, a clamping platen spaced from said first platen, a movable platen positioned and movable between said first and clamping platens, a toggle linkage actuatable for moving said movable platen towards and away from said first platen, said toggle linkage including link means pivotally connected to said movable platen, link actuating means connected to said link means for moving said link means between open and closed platen positions, first cylinder-and-piston means including a movable clamping element connected to said link means and fluid actuatable for exerting a clamping force on said movable platen through said link means, second cylinder-and-piston means including a movable element fluid-caused to yieldably restrain said clamping element from moving during movement of said link means to their closed platen positions, control means for controlling the supply of fluid to said first cylinder-and-piston means and operable to prevent such flow, and means responsive to movement of said clamping element during movement of said link means to their said closed platen positions to cause said control means to prevent such flow.

7. A molding machine according to claim 6, wherein the area of said clamping element on which the actuating fluid acts is substantially larger than the fluid engaging area of said movable element of said second cylinder-and-piston means.

8. A molding machine comprising a first platen, a clamping platen spaced from said first platen, a movable platen positioned and movable between said first and clamping platens, a toggle linkage actuatable for moving said movable platen towards and away from said first platen, said toggle linkage including link means pivotally connected to said movable platen, link actuating means connected to said link means for moving said link means between open and closed platen positions, first cylinder-and-piston means including a movable clamping element connected to said link means and fluid actuatable for exerting a clamping force on said movable platen through said link means, and second cylinder-and-piston means including a movable element fluid-caused to yieldably restrain said clamping element from moving during movement of said link means to their closed platen positions, the movable elements of said first and second cylinder-and-piston means being the pistons thereof, and the piston of said second cylinder-and-piston means being provided with a rod for engaging the piston of said first cylinder-and-piston means.

9. A molding machine according to claim 8, wherein the diameter of the piston of said second cylinder-and-piston means is substantially smaller than the diameter of the piston of said first cylinder-and-piston means.

10. A molding machine comprising a first platen, a clamping platen spaced from said first platen, a movable platen positioned and movable between said first and clamping platens, a toggle linkage actuatable for moving said movable platen relative to said first platen, said toggle linkage including a plurality of links pivotally interconnected and pivotally connected to said movable platen, link actuating means connected to said links for moving said links between closed platen positions wherein said links are generally aligned and open platen positions wherein said links extend to one side of their said closed platen positions, said clamping platen containing a cylinder, a first piston in said cylinder and connected to said links for exerting a clamping force on said movable platen through said links, means for supplying pressurized fluid to said clamping platen cylinder for causing said first piston to apply said clamping force, control means for controlling flow of fluid to said clamping platen cylinder and operable to prevent such flow, second cylinder-and-piston means including a second piston fluid actuatable for yieldably restraining movement of said first piston during movement of said link means to their said closed platen positions, means for supplying fluid to the cylinder of said second cylinder-and-piston means to cause said second piston to so yieldably restrain such movement of said first piston, and means responsive to movement of said first piston caused by movement of said links to their closed platen positions for operating said control means to prevent flow of fluid to said clamping platen cylinder.

11. A molding machine according to claim 10, wherein the area of said second piston on which the fluid acts is substantially smaller than the area of said first piston on which the fluid acts.

12. A molding machine according to claim 11, wherein said second piston is provided with a rod extending into said clamping platen cylinder to engage said first piston.

13. A molding machine according to claim 12, wherein said rod is of a length to permit fluid supplied to the cylinder of said second cylinder-and-piston means to cause said second piston to yieldably restrain said first piston in spaced relationship to the ends of said clamping platen cylinder.

\* \* \* \* \*